United States Patent Office 3,255,601
Patented June 14, 1966

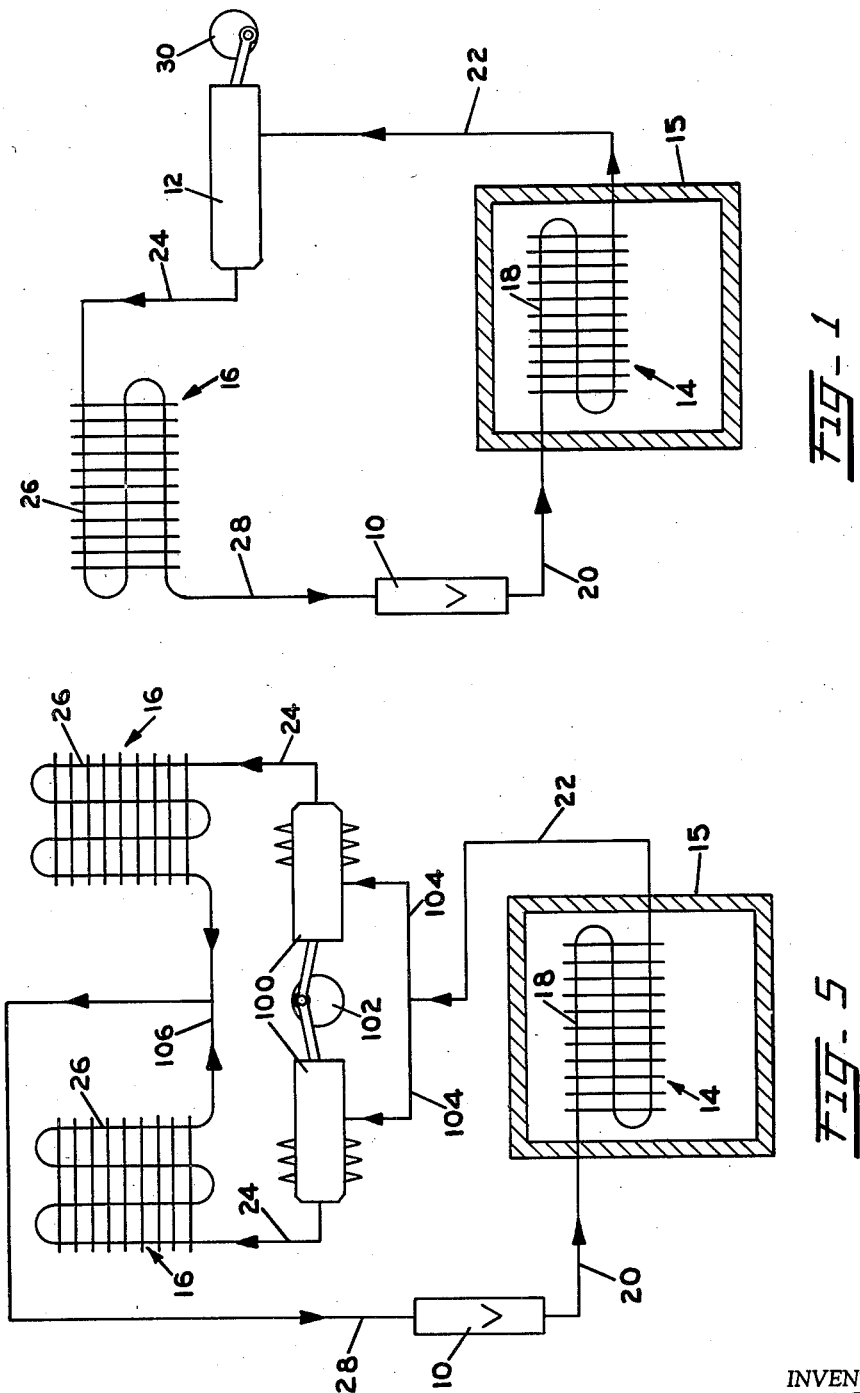

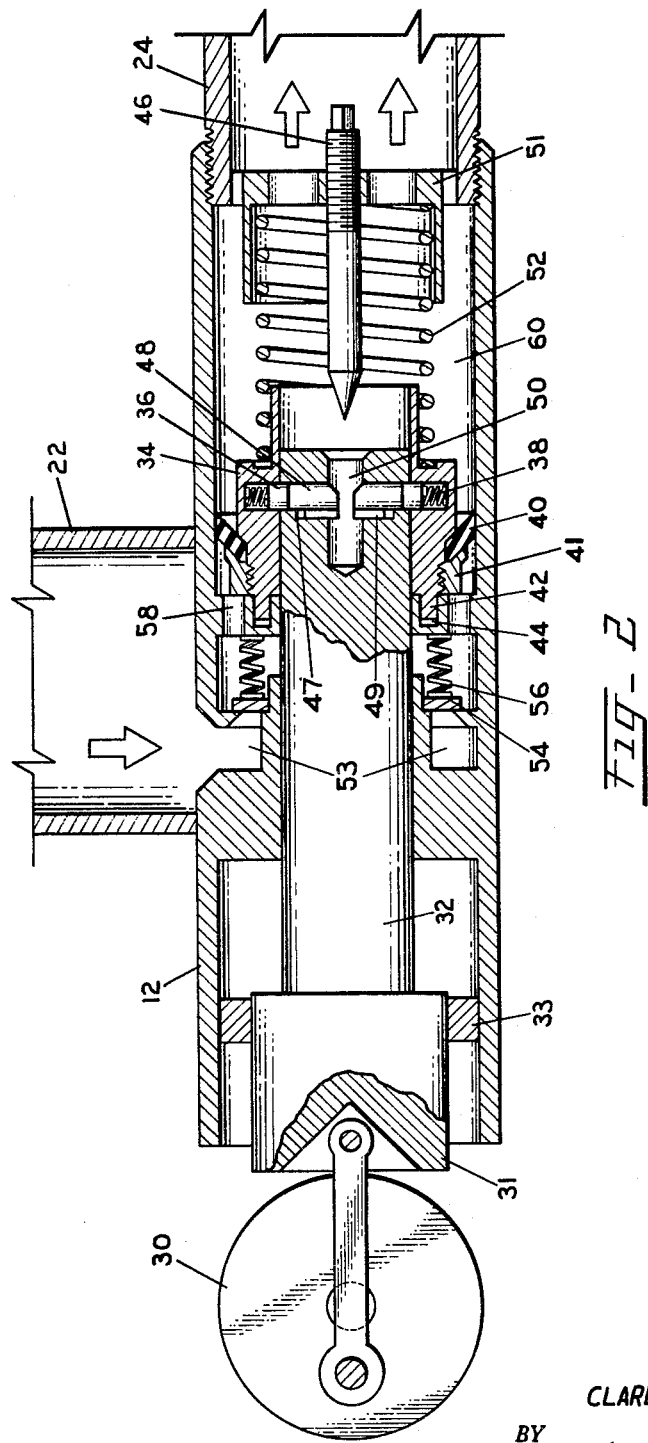

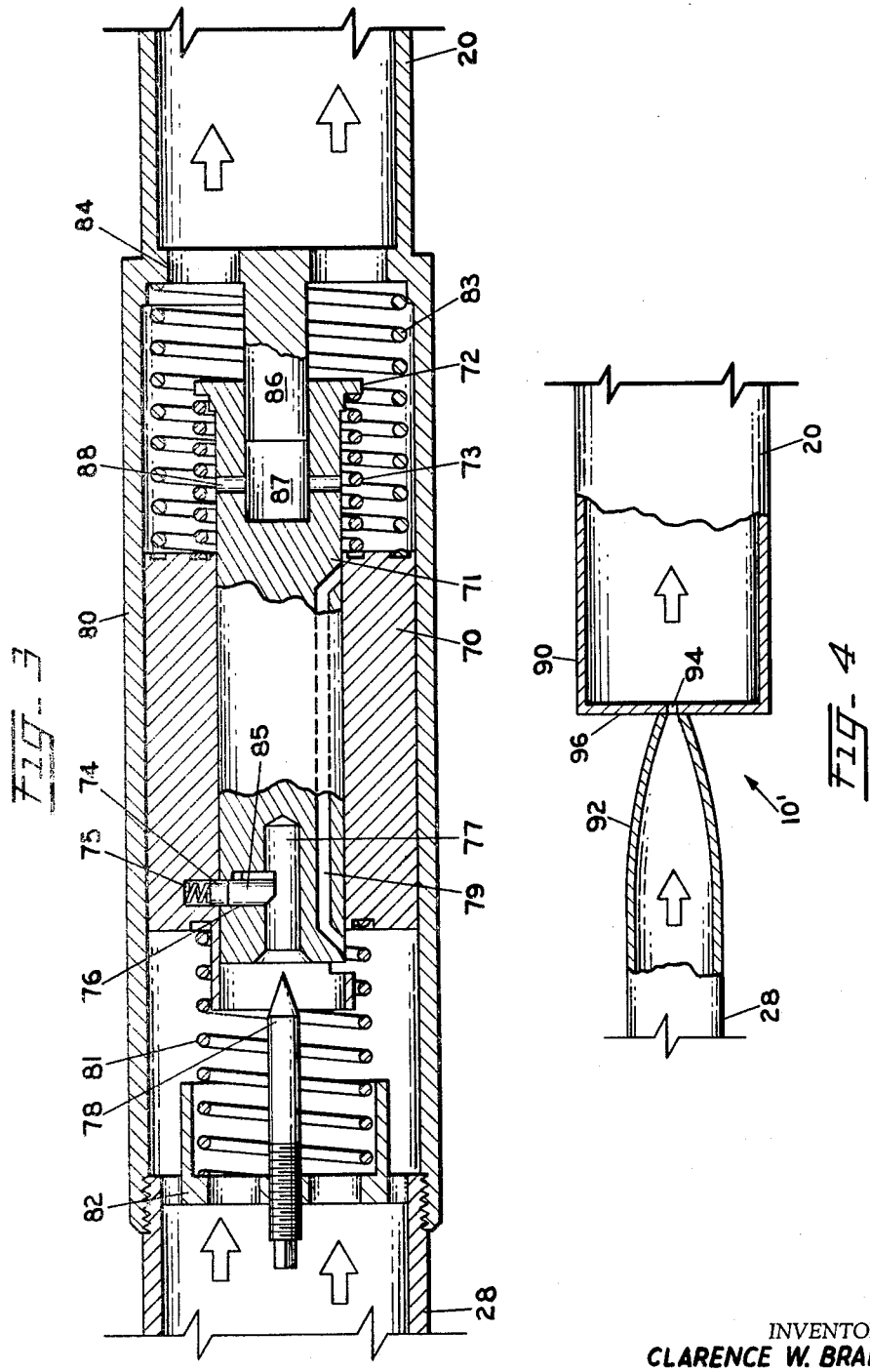

---

3,255,601
METHODS AND APPARATUS FOR UTILIZING IMPLOSIVE REACTIONS IN REFRIGERATION AND HEAT TRANSFER PROCESSES
Clarence W. Brandon, Tallahassee, Fla., assignor of twelve and one-half percent to Orpha B. Brandon, Tallahassee, Fla., and fifty percent to Nat A. Hardin, Catherine H. Newton, and Hazel H. Wright, jointly, all of Forsyth, Ga.
Filed Nov. 3, 1961, Ser. No. 149,953
9 Claims. (Cl. 62—115)

This is a continuation-in-part of application Serial No. 853,405, filed Nov. 16, 1959. This application also contains subject matter similar to U.S. Patent 3,006,154, issued Oct. 31, 1961.

This invention relates to refrigeration and related thermal energy transfer systems. More particularly, this invention comprises new and useful improvements in refrigeration and related heat transfer methods utilizing sonic standing waves and/or energy bearing waves created by implosive reactions within the systems to increase the efficiency of heat transfer therein.

All refrigeration systems operate under the scientific laws of thermodynamics, heat transfer and fluid flow. Ordinarily, a working fluid, known as a refrigerant, is used to carry away heat from the region to be cooled. The most common systems are the mechanical compression type and absorption type. Although both operate under different theories, they both depend upon the efficiency of thermal transfer in a condensation phase, where latent heat of the refrigerant is removed, and an evaporation phase, where latent heat of the region to be cooled is added to the refrigerant.

Accordingly, the principal object of this invention is to provide methods and apparatus for increasing the efficiency of thermal transfer in refrigeration and related processes through the use of implosive reactions, energy bearing and/or sonic standing waves. In particular, an object of this invention is to increase the efficiency of a refrigerating system by the maintenance of standing waves of sonic characteristics in the condenser and/or the evaporator thereof to facilitate the transfer of heat therein.

A further object of this invention is to effect or assist in maintaining, by the application of sonic vibrations and energy bearing waves thereto, the condensing portion of the refrigerant of a circulating refrigerating system in a substantially liquid phase and to maintain the evaporator portion of the refrigerant in a substantially vapor phase.

An object is to provide in conjunction with the above-mentioned objects, methods and apparatus whereby energy, introduced into a refrigerating system, maintains sonic vibrations or energy bearing waves in the system for effecting and/or facilitating the transfer of heat into and from the system.

A further object in conjunction with the aforementioned objects is to utilize the eduction of liquid into the evaporator and/or the conducting of the vapor into the condenser for creating and/or augmenting a sonic and/or energy bearing standing wave in the system.

Another object of this invention is to provide a cyclic refrigerating method and means whereby a portion of the heat of compressed refrigerant is transmitted and reflected throughout the condenser at sonic velocity.

A still further object of this invention is to provide a cyclic refrigerating method and a means whereby a portion of the heat absorption characteristics of the refrigerant is transmitted and propagated as a wave at sonic velocity throughout the evaporator.

Another object of this invention is to provide a more efficient refrigerating method permitting a reduction in the size of a refrigerating system.

A yet further object of this invention is to provide a method in accordance with the foregoing objects wherein the means for causing circulation of refrigerant unidirectionally throughout the system is employed to produce and maintain a standing wave of a sonic nature in the refrigerant for improving the efficiency of the system.

An additional object of this invention is to provide a method and apparatus whereby a plurality of energy bearing waves of sonic nature are individually produced and combined in the condenser portion of a refrigerating system to produce a temperature and pressure rise therein by their mutual cancellation and to dissipate the heat evolved.

A further object of this invention is to produce implosions and implosive reactions within a refrigerating system whereby energy requirements are reduced as needed for operation of the system.

Anothr object of this invention is to provide a method of substantially and instantaneously converting an entering vapor into liquid within a liquid filled container and causing the rejection of heat therefrom. And yet another object in conjunction with the last above object is to utilize some of the energy contained in the entering vapor to assist in the creation of and/or maintenance of an energy bearing wave in the liquid within the container.

An additional extremely important object of this invention is a method of creating and/or increasing of a volume of less pressure within the substantially all liquid phase in the condenser of a refrigerating system by substantially instaneously equalizing the pressures or collapsing the higher pressures into the lesser pressures in the condenser to cause implosions and resultant implosive reactions within the condenser.

An object in conjunction with the last above object is to allow vapor to be induced from the evaporator into the volume of less pressure and by the implosion and implosive reaction to cause conversion of the vapor into the liquid of the condenser and the utilization of the energy contained in the heat of the vapor to assist in the augmentation of the energy contained in the implosive reaction.

An important object in conjunction with the last two objects is to allow previously created reflected energy bearing waves to combine with the implosive reactions so as to assist in the maintenance of energy bearing standing waves in the refrigerating system.

A primary object of this invention is to provide a method of refrigeration and apparatus in conjunction therewith for creating and utilizing sonic and/or energy bearing waves formed by an implosion reaction condition. A further object is to create an implosive reaction in the condenser of a refrigeration system by eduction of liquid from the condenser into the evaporator, which implosive reaction may be the sole means of creating implosive reactions in the condenser or an augmenting factor to those implosive reactions created in the entry of vapor into the condenser.

A still further object is to create and/or continue sonic waves within the evaporator of a refrigeration system by the eduction of liquid refrigerant from the condenser into the evaporator.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic view illustrating in its simplest form the application of the principles of this invention to a conventional refrigerating system of the circulatory type;

FIGURE 2 is an enlarged view in vertical section through the pump forming a part of the circulatory system;

FIGURE 3 is an enlarged view in vertical section through a portion of the expansion valve of the refrigerating system;

FIGURE 4 is a view similar to FIGURE 3 but is a modified form of fluid expansion means which may be employed in the system; and FIGURE 5 is a diagrammatic view showing a modified application of the principles of this invention to a refrigerating system of the circulatory type.

*General description*

Generally speaking, this invention is concerned with the utilization of an implosive effect to increase the efficiency in thermal transfer or vapor-liquefying systems such as cyclic refrigeration systems. An implosive effect, as distinguished from an explosive effect, is created by the substantially instantaneous inrush of a relative high pressure fluid into a zone of low pressure. The creation of an implosion reaction resides first, in establishing a zone or space of low pressure within the confines of a high pressure fluid. In some instances the high pressure is caused by hydrostatic pressures, or in other instances by mechanically created pressure, such as with pumps, compressors, etc., and secondly, establishing instantaneous communication or collapse between the low pressure space and high pressure fluids. The enormity of the implosive reaction and its resultant pulses will vary according to the differential pressure established between the low and high pressure spaces, the volume of the low pressure space, and upon the instantaneity of communication between the two spaces.

Typically, the implosive reaction caused by the instantaneous communication of high pressure and low pressure zones creates an initial negative or rarefaction wave impulse instead of a positive pulse, as is created from an explosive reaction. Immediately following the rarefaction wave pulse is the opposite reactive, compression, or positive high pressure pulse. In some instances this latter pulse energy is greater than the former. As used and defined herein the term implosive or implosion reaction pulses is defined to include both the initial rarefaction pulse and positive or compression pulse and those pulses resulting thereafter.

It is known in the refrigeration art that "wet compression" facilitates the transfer of heat from the compression of the heat laden vapor into the condensing medium. Various means have been employed to effect this "wet compression" including cycling of a portion of the liquid refrigerant from the bottom of the condenser and allowing it to mingle with the vapor during the compression cycle. In the present invention, use is made of energy bearing waves and/or sonic vibrations of predetermined characteristics in the form of a standing wave as created by implosive reactions to further the advantages of "wet compression" and to facilitate the change of vapor-liquid phases of the refrigerant in the condenser and/or the evaporator of a circulating refrigerating system. The phase changes of the refrigerant, thermal transfers between the evaporator or the condenser and the surrounding heat exchanging medium are greatly facilitated, thereby contributing to the increased efficiency of the refrigerating system.

Further, and more specifically this invention concerns the substantially instantaneous collapse and equalization of pressure (implosion) between a low pressure space or space of increased volume created within a relatively higher pressure fluid such as the liquid in a refrigerating system condenser, or a heat pump system, or a container of pressure fluid having heat exchange with a heat conducting medium.

Additionally, this invention also relates to a method and process of readily and speedily converting and/or co-mingling a vapor with a liquid within a pressured container, wherein heat of the vapor is substantially and instantaneously given over to assisting in the creation of and/or the maintenance of energy bearing waves in the pressured container.

*Detailed description*

In FIGURE 1 there is a diagrammatically illustrated a refrigerating system of the circulatory type to which the principles of this invention may be easily applied and which system includes an expansion valve 10, a refrigerant circulating pump 12, an evaporator unit indicated generally by the numeral 14 and a condenser unit indicated generally by the numeral 16. The evaporator unit is considered to extend from the expansion valve 10 to the intake side of the circulating pump 12, while the condenser unit is understood to extend from the discharge side of the circulating pump 12 to the expansion valve 10. In the refrigerating system illustrated, the refrigerant is understood to have a unidirectional circulation as indicated by the arrows in FIGURE 1.

The evaporator unit 14 consists of a set of evaporating coils 18 which are understood to be in good heat exchange relation with a heating medium from which heat is to be removed for cooling the medium, as for example, the interior of a refrigerated device 15. The evaporating coils 18 of the evaporator are connected as by a conduit 20 with the expansion valve 10 and by a further conduit 22 with the intake side of the refrigerant circulating pump 12, it being understood that the coils 18 together with the conduits 20 and 22 comprises the evaporator unit 14.

The condenser unit 16 likewise includes a conduit 24 which receives the refrigerant discharged by the circulating pump 12 and by means of which the refrigerant is delivered to the condensing coil 26 which likewise is in heat exchange relation with a surrounding medium, the latter being a cooling medium by means of which heat may be discharged from the condensing coil 26. Typical examples of coolants includes most fluids such as air or water. The condensing coil 26 is connected as by a conduit 28 with the inlet side of the expansion valve 10, the conduits 24 and 28 together with the condenser coil 26 comprising the condenser unit 16.

It is to be understood that the pump 12 is operated from any suitable power source as diagrammatically shown by means of a crank shaft 30.

Attention is next directed to FIGURE 2 for an explanation of the refrigerant pump 12 employed with this invention.

As will be seen in FIGURE 2, the pump 12 includes a cylindrical body in which is slidably received a piston 32 which is connected with the crank shaft 30 for reciprocation thereby.

Piston 32 includes a crosshead 31 reciprocably supported by bearing surface 33. The forward end of the piston includes cylindrical member 34 which is locked with respect to the piston by a plurality of radial latch pins 36 forced thereinto by springs 38. Resilient packing member 40 is retained with member 34 by threaded gland ring 41. Rearwardly of member 34 is projecting 42 which operates within substantially matching recess 44 and thereupon acts as a dashpot for purposes later described.

Springs 38 are biased to force pins 36 inwardly, normally locking members 34 and piston 32 together. Pins 48 are operably contiguous with latch pins 36 within the piston 32. A limit stop 47 cooperates with key 49, the latter of which is a part of pin 48, to prevent the outward movement of the pin beyond the peripheral limits of piston 32. The pins 48 extend radially within a central bore 50 opening toward the extreme end of the piston 32 with respect to adjustably affixed member 46 which operates therein. Member 46 is threadably attached to a downstream perforated baffle 51. A tension spring 52 extends to and between baffle 51 and member 34 and normally tends to force member 34 rearwardly with respect to piston 32, which is prevented until release of latch pins 36.

Evaporator 14 is in communication with inlet 53 by conduit 22. Downstream space 60 is in communication with and filled with the liquid refrigerant within the condenser unit 16, and is sealed from the vapor of evaporator 14, entering through conduit 22, by a plurality of circumferentially spaced flapper valves 54, which are biased in a closed position by springs 56.

Reference is made to FIGURE 3 for a description of the expansion valve assembly 10 which is employable in this invention. The end of the conduit 28 from the condenser communicates with the inlet of valve assembly cylinder housing 80. The outlet communicates with evaporator conduit 20.

A first piston 70 is slidable in the cylinder 80 between the inlet and outlet. Spring or resilient means 81 extends to and between inlet baffle 82 and one end of piston 70 while spring or resilient means 83 extends to and between outlet baffle 84 and the other end of piston 70. These springs normally urge piston 70 into a central location between them. Centered within piston 70 is second piston 71 which has a retaining flange 72 for spring or resilient means 73 which is held in compression against the end of piston 70. One or more latching pins 74 extend radially outward partially from first piston 70 under the urging of spring 75 into aligned recesses 76 within second piston 71 which locks the two pistons together, until released as hereinafter described. Releasing pin 85 radially operates, within limits, in the aligned recess 76 from a centrally located bore 77 to unlatch the pistons. This occurs during the operation by movement of the bore 77 with respect to aligned trip 78, the latter of which is adjustably fixed to inlet baffle 82. A stop and guide 86 formed as a part of baffle 84 is slidingly engaged in bore 87 of second piston 71. Fluid access bores 88 provide a dashpot or cushioning means for the reverse thrust of the pistons.

In a refrigerating system wherein the implosive reaction device of FIGURE 3 is used as the expansion valve, there is provided a bore 79 extending longitudinally of second piston 71 and is arranged to be closed at its lower end by first piston 70 when the two pistons are locked into one unit.

The bore 79 is preferably caused to be closed from its liquid, input, end by the outer piston 70 when the two pistons reach their maximum separation. In some instances it is desired to leave the bore 79 in open communication between the condenser (inlet) and evaporator (outlet) until the two pistons lock together again on a reverse cycle.

It is well known that waves with sonic characteristics may be reflected and focused to a central point of intensity. Use is made of these two known facts, in order to focus and conduct a periodic energy bearing wave through a capillary orifice and into the evaporator to thereby establish and maintain a sonic or energy bearing standing wave therein. In FIGURE 4 a modified expansion valve 10' is shown which utilizes these facts. A casing 90 communicates its outlet with the pipe 20 to the evaporator. The inlet end from condenser conduit 28 connects with inwardly converging member 92 which terminates at orifice 94 within closure wall 96 of casing 90. The member 92 constitutes a parabolic or focusing surface whose terminus converges to and communicates with the capillary orifice 94. This orifice 94 constitutes the focus of the reflecting surfaces whereby the energy bearing wave generated within the condenser unit as previously mentioned is caused to focus at and thus communicate with the interior of the casing 90 through the orifice 94. At this focus, there is thus produced a standing wave in the evaporator unit.

A modified method and apparatus in accordance with this invention is disclosed in FIGURE 5, in which the same numerals designate the same parts employed in connection with the embodiment of FIGURES 1–3.

As in the preceding embodiment, the expansion valve assembly is indicated by the numeral 10, while a pair of circulating pumps, each indicated by the numeral 100, and which are connected to a driving crankshaft 102 at a phase angle of 180 degrees, are provided. A condenser unit 16 is connected to each of the pumps 100 while a single evaporator unit 14 is connected between the expansion valve assembly 10 and the pair of circulating pumps 100.

The evaporator unit includes the evaporating coil 16, as previously mentioned, and this coil is connected to the discharge side of the expansion valve 10 as by a conduit 20, while the conduit 22 connecting the evaporator coil 18 to the intake side of the circulating pumps 100 is provided with branched conduits 104, each connected to the intake side of one of the pumps.

Each condenser unit 16 includes a condenser coil 26 and these condenser coils have their discharge ends connected to each other as by a conduit 106 which is in free communication with the conduit 28 by means of which the condensing coils are connected to the intake side of the expansion valve 10.

As shown by the arrows in FIGURE 5, a uni-directional circulation of refrigerant is obtained, the vapor from the evaporator chamber being distributed by the branched conduits 104 to the pair of circulating pumps 100, and from thence through the pair of condenser coils 26 and by means of the conduit 106 to the liquid condensate return conduit 28 which delivers the condensed refrigerant to the expansion valve 10.

*Operation*

The preferred operation of this invention is best understood with reference to FIGURES 2 and 3 as these implosive creating and augmenting devices are used either singly or in combination within refrigerating systems such as are diagrammatically described in FIGURES 1 and 5.

Reciprocation of piston 32 and attached member 34, by power crank 30, during a cycle, causes a compressive force upon the liquid refrigerant within chamber 60. Simultaneously relatively a rarefied low pressure area is produced between packing member 40 and valve 54, which are in communication through ports 58. When this rarefied area becomes of sufficient reduced pressure, valve 54 will open and allow vapor from evaporator 14, via conduit 22, to enter the rarefied area. In this respect the introduction of vapor is somewhat akin to introduction of vapor into a cylinder of a conventional compressor. Beyond this point the similarity of operation no longer exists. Continuing the movement of piston 32, stationary member 46 enters bore 50 in the out thrusting piston. Release pins 48 are forced radially outward, forcing latch pins 36 beyond the periphery of piston 32. This releases member 34 whose direction and thrust is substantially instantaneously reversed by spring 52.

The reversal of member 34 creates an opposing rarefied force in the liquid of the condenser against that created by the maximum accelerations outward of piston 32, so that the low pressure created approaches absolute zero. The amount of rarefied volume produced for each piston stroke is a function of the maximum acceleration achieved by the piston 32 and member 34 and the length of the reversal release of member 34, where other factors are maintained the same.

It has been found by extensive experimentation that rarefied volumes considerably in excess of that produced by an identical length of stroke and volume of induced rarefication in a conventional compressor, can be created by the means described above. When the vapor from evaporator 14 induced past resilient member 40 and valve 54 into this created rarefied area, the imploding of the outward thrust liquid refrigerant into the vapor induced into the rarefied area causes an implosive reaction wherein the heat of the vapor adds to the compressive portion of the implosive reaction and conveys this sonic energy converted from heat into the condenser at the velocities of sound within the refrigerant medium.

The compression portion of these created implosive reactions always follows outwardly in time the extremely rarefied portion of the implosion, and where the condenser system is of a half wave length or multiple thereof of the prime or fundamental frequency of the motions of the piston or one of its harmonics, the reflections of these sonic pulses, which have an advance extremely rarefied portion and a resultant very forceful reactive compressive portion, will combine with and reinforce the subsequent implosive reactions by energy returned to piston 32, as well as being an additive means of inducing vapor into the condenser and lowering to a considerable degree the energy requirements for transfer of a given quantity of heat from one location to the other.

Where vapor is being liquefied and where vapors are being mixed or blended with liquids and a resultant liquid is desired, the above use of implosive reaction pulses, combined with the transfer of heat of liquefication or blending, allows a conversion of heat into energy or augmented energy with sonic characteristics for transfer at sonic velocity to a place of disposal or utilization of the sonic energy thus produced.

It will thus be apparent that uni-directional step-by step movement will be imparted to the refrigerant by the piston whereby the same will be drawn in from the evaporator and propelled into the condenser unit. In accordance with conventional practice in refrigerating systems of this general type, it is understood that the compression of the refrigerant during its transfer by the piston from the evaporator to the condenser will tend to convert the refrigerant from the vapor to its liquid phase, this conversion being of course facilitated by the dissipation of heat from the coils 26 of the condenser into the surrounding cooling medium.

Under the pressure of the pump unit 12, the refrigerant is propelled from the condenser coils 26 by means of the conduit 28 to the expansion valve 10, from whence the liquid refrigerant is discharged into the evaporating unit and thus by its expansion and conversion from the liquid to the vapor phase is employed to absorb heat from the medium surrounding the evaporator coils 18 and thus cool such medium. The vapor returns via conduit 22 to the compressor intake.

On the return cycle of piston 32, member 34 is reconnected at that position where latch pins 36 align with the release pin opening and thus enter same under the urging of spring 38. Thereafter the cycle is repeated until the desired temperature within the refrigerated device 15 is reached.

Referring now to FIGURE 3, the operation of the expansion valve 10 is described. To begin, pistons 70 and 71 are locked together by latch pin 74 which maintains spring 73 in compression. The pistons, as a unit, are free to oscillate from energy bearing forces reflecting from either end of conduits 28 and/or 20. Pressured liquid forces against the end of locked pistons 70 and 71, from conduit 28 and condenser 16, together with the compression portion of an energy bearing or sonic wave forcing the pistons to compress spring 83. The rarefaction portion of the wave plus the force of compressed spring 83 normally causes the pistons to reverse as a unit, now compressing spring 81. Tripping means 78 then enters bore 77 and contacts release pin 85. The radial movement of pin 85 forces latch pin 74 outwardly of the second piston 71 into a recess in piston 70 against spring 75. The force of compressed spring 73 separates the two pistons in substantially instantaneously opposing directions. That is, piston 70 continues its inertial motion while piston 71 reverses. This relative instantaneous motion reversal creates a void or area of low pressure surrounding the pistons. The implosion or implosive reaction occurs thereafter, when the higher pressure fluid and energy collapse into the relatively low pressure void, which in some instances can be caused to approach pressures of absolute zero. The implosive reaction pulse energy then causes the compressive or positive pressure energy portion to reach peak pressures amounting to many tons of pressure per square inch. Simultaneously with the creation of the void or area of low pressure there is an outward rush of energy downstream because of moving piston 71 and upstream by inertial movement of piston 70 followed by an instantaneous reversal of energy and fluid in the other direction wherein the two pistons become relatched and the cycle is repeated.

The implosion and its reaction energy move outward from the pistons into conduit 28 in the form of a leading extremely rarefied portion followed by a powerful positive pressure portion as a result of the implosive reaction. These energy pulses continue travelling outward toward the other end of the condenser at sonic velocities which results in improved heat transfer within the condenser. The use of the device of FIGURE 3 may be used to solely create this phenomenon and/or maintain and augment implosive reactions which can be formed by apparatus such as generator 12 shown in FIGURE 2.

In a refrigerating system wherein the implosive device of FIGURE 3 is used as the expansion valve, there is provided a bore as at 79 which can be arranged to be closed at its lower end by outer piston 70 when the two pistons are locked into one unit, but when the inner piston 71 is released there is a momentary time when communication is made between the liquid of the condenser 16 and the conduit 20 leading to the evaporator 14, so that the cooled liquid is allowed to expand and absorb heat into the evaporator. The bore 79 is best caused to be closed from its liquid end by the outer piston 70 when the two pistons reach their maximum separation, but in certain instances it may be desired to leave the bore 79 in open communication between the condenser and evaporator until the two pistons lock again.

Where the bore 79 is closed again at the maximum separation of the two pistons, then the volume within the bore is a metering factor in the amount of liquid refrigerant that is transferred from the condenser to the evaporator during each of the implosive reaction pulses, for the liquid in the bore will be free to expand during the separation of the two pistons. This controlled ejection or eduction of liquid during a timed phase angle portion of the rarefaction portion of the energy bearing wave created by the implosive reaction is of itself a factor in causing and/or augmenting the creation of the low pressure or void into which pressure and energy collapses and creates the energy bearing wave.

Where the implosive reaction generator of FIGURE 3 is used as the sole source of implosions, as in a refrigerating system wherein a pump 12 as in FIGURE 1 is pumping vapor into the condenser as at 16 and wherein the expansion valve as of FIGURE 3 is used, then the bore 79 in inner piston 71 could be so arranged as to be in communication between conduits 28 and 20 when the pistons 70 and 71 are in locked condition, but to where bore 79 is sealed when pistons 70 and 71 unlatch and are separated.

The operation of the above would be that after the pump 12 was stopped, then tripping means 78 would separate the two pistons 70 and 71 almost immediately upon bleeding down of the pressure of the liquid in the condenser through bore 79. When this occurred then the condenser would remain substantially filled with liquid. Immediately upon starting the pump 12 again, pressure would build up in the condenser and cause the two pistons to lock together again. But as the bore 79 would start bleeding off the pressure again from the condenser into the evaporator, then the two pistons would separate again in an implosive reaction which would cause subsequent implosions and would soon be reinforced by reflections into creating and maintaining an energy bearing standing wave in the condenser and in the evaporator as long as the pump 12 continued to circulate refrigerant from the evaporator. In this manner where the generator as shown in FIGURE 3 was the sole means of creating implosive reactions in a system, then the extreme rarefactions leading the intense pressure peaks of the implosions would cause entering vapor from a pump or compressor to be caused to drop heat energy of the vapor into an assisting means of maintaining the implosions and in so doing to be substantially instantaneously liquefied.

It can now be seen that the ejection of liquid refrigerant into the conduit 20 and its simultaneously adding of sonic energy to that created by released inner piston 71 and the short time later force of returning outer piston 70, all together are additive to form a substantial energy bearing or sonic pulse that travels and reflects at sonic velocity within the refrigerant fluid of the evaporator.

A refrigerating system employing both the implosive generators as of FIGURES 2 and 3, when properly connected with the introduction of vapor into the condenser from one generator and the ejection of liquid refrigerant into the evaporator by the other generator, is especially advantageous due to the lowering of energy requirements of the system and the increased transfer of heat by breaking down surface tension of films of both the liquid and vapor on contacting surfaces containing the refrigerant.

In the form of the invention shown in FIGURE 5 it is observed that the energy bearing waves produced by the pumps 100, each of these pumps being preferably identical with the pump disclosed in FIGURE 2, are 180 degrees out of phase, and thus will cancel or neutralize each other in the conduit 106. Consequently, the standing waves produced by the two pump generators, are cancelled before the refrigerant is discharged into the conduit 28. This cancellation of the energy bearing waves results in the creation of pressure and heat. This heat is removed from the condenser through the surrounding cooling medium, thereby assisting in cooling the refrigerant to such an extent that the conduit 28 will be filled with the refrigerant in its liquid phase. In this system, therefore, the generation of the energy bearing wave is confined to the conduit section extending from the pumps 100 to that portion of the conduit 106 where the two waves, which are 180 degrees out of phase with respect to each other, are neutralized and cancelled.

In this form of the invention, the producion of a standing wave may be confined to the condenser unit and will not be communicated to the evaporator unit. Alternatively, however, additional wave generating means may be provided for the evaporator unit.

Modifications

Although the generator of FIGURE 2 is shown as being operated by outside energy, yet it can be constructed like FIGURE 3 and be operated by energy bearing waves. Also the generator of FIGURE 3 can be operated by an outside energy source such as the crank of FIGURE 2 or other outside sources of energy besides sonic or internal pressure forces as described.

Both of these implosive reaction generators as operatively shown and their variations as are capable of being conceived by those skilled in the art are useful for many other forms of industry besides refrigeration, heat pumping, heat transfer, and liquefication and blending of vapors, both singly or together.

It is to be understood that the piston 32 of FIGURE 2 and/or the piston 70 of FIGURE 3 may be sonic wave oscillators that create or maintain sonic standing waves in their respective fluid containers and the implosions and implosive reactions may be caused to occur during only one out of a multiple of oscillations of these sonic wave generators, as well as during selected phase angles of the sonic waves. In order to allow this to occur, tripping member 46 of FIGURE 2 and 78 of FIGURE 3 may be so contoured radially as to allow a tripping surface only on a portion of its circumference and a rotating means attached thereto so that a given number of oscillations of the pistons would be required before the tripping means is utilized. This rotating device could, in one embodiment, be an automotive type valve rotator that could mount under the spring 52 of FIGURE 2 and spring 81 of FIGURE 3 and be operatively connected to the rotatable end portion of contoured tripping means 46 of FIGURE 2 and/or 78 of FIGURE 3. It has been found that extremely intense and high pressure peaks and relatively long in duration and low pressure rarefied portions of a sonic standing wave can be created and maintained by modulating sonic standing waves with implosion and implosive reactions at one out of every fourth wave cycle, for example. However, this concept is not so limited as to such use, but includes all those variations that occur to those skilled in the art.

It is within the concepts of this invention that the creation and/or maintenance means for energy bearing or sonic waves shown herein may be employed in various saline water conversion processes. As for instance in the direct freezing processes wherein the evaporator as herein claimed may be a container of saline water from which the heat of fusion may be removed by the refrigerant being in direct contact with the saline water, and the refrigerant may be the water vapor or immiscible or volatile compounds such as the Freons, or butanes, etc., which are removed from direct contact with the water by causing a low pressure to be maintained on the container and thus cause vaporization of the refrigerant. The use of energy bearing waves are particularly conducive to saline water conversion in that the removal of the refrigerant from the saline water and the formation of ice thereby would be greatly enhanced by the energy bearing waves therein, this factor of increase of efficiency being additive to the low energy requirements of condensing the removed vapors within the condenser. It is also within the concepts of this invention, where water vapor removed from the container is the direct refrigerating means, that the water vapor condensed in the condenser may be drawn off as product or fresh water while also using the ice so formed in the container upon being melted as another source of fresh or product water. In this manner the heat rejected or transferred in the condensing of the refrigerant by the energy bearing waves may be the melting means when so placed in heat exchange with the ice. This invention may also be used in the various hydrate processes and vapor compressive systems that are used in saline water conversion to fresh water.

In the refrigerating system as so far described, the condensing unit is maintained substantially filled with the refrigerant in its liquid phase from the circulating pump 12 to the expansion valve 10, while the evaporator unit 14 receives the refrigerant in its vapor phase from the expansion valve 10 to the intake of the refrigerant pump 12 or there may be if desired a liquid pump or basin in the evaporator. I have found that the efficiency of heat exchange of a system of this character may be increased by creating and maintaining an energy bearing sonic wave, preferably in the form of a standing wave, in the condenser unit, or in the evaporator unit, or both. Although the specific action of a sonic or energy bearing standing wave in the units of refrigerating systems are not to the fullest extent understood, it is found that at least two-fold result is produced thereby. First, it is that the turbulizing or agitation in the flow of the refrigerant in either the condenser or the evaporator or both, serves to increase the facility and effectiveness of the heat transfer co-efficiency of the vapor and liquid phase contacts with the containing walls of the system by the reduction in the thickness of the boundary layers on these walls through which the heat must be transferred. Secondly, the conversion of vapor into liquid by the compressive force of the implosive reactions allows conversion of heat of vaporization into a substantial amount of energy with sonic characteristics so that the energy is utilized and/or attenuated at a point distant from its entry into the condenser, and the sonic standing wave in the evaporator assists in the breaking of surface tension of any liquid allowed in the evaporator as well as causing uniform distribution of heat inducing low pressure vapor throughout the evaporator.

It is understood further that this invention and its concepts extend to absorption refrigeration processes.

The foregoing is considered as illustrative only of the principles of this invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed:

1. A method of refrigeration in a system having a condenser, an evaporator, and means circulating a refrigerant first, under pressure as a substantially liquid phase through said condenser and secondly, under reduced pressure as a substantially vapor phase in said evaporator, comprising the steps of,
   creating a separately confined volume within said liquid phase of pressure less than the pressure of said liquid phase,
   inducing said vapor from said evaporator into said volume, and
   substantially instantaneously communicating said volume with said liquid phase, whereby the heat of said vapor from said evaporator is absorbed by the collapse of said liquid phase upon said induced vapor within said condenser while simultaneously withdrawing heat from said condenser.

2. A method of refrigeration in a system having a condenser, an evaporator, and means circulating a refrigerant first, under pressure as a substantially liquid phase through said condenser and secondly, under reduced pressure as a substantially vapor phase in said evaporator, comprising the steps of,
   creating an enclosed confined volume within said liquid phase of pressure less than said refrigerant in said liquid phase and less than the pressure of said vapor phase,
   inducing said vapor from said evaporator into said volume, and
   substantially instantaneously communicating said phases within said volume to create an implosive reaction within said liquid phase,
   utilizing a portion of the energy of said reaction to repeat said steps.

3. A method of refrigeration in a system having a condenser, an evaporator, and means circulating a refrigerant first, under pressure as a substantially liquid phase through said condenser and secondly under reduced pressure as a substantially vapor phase in said evaporator, comprising the steps of,
   periodically creating a separately confined volume within said liquid phase of pressure less than the pressure of said liquid phase,
   inducing said vapor from said evaporator into said volume,
   substantially instantaneously interconnecting said volume with said liquid phase to cause implosive reaction pulses, and
   causing said pulses to be reflected in said liquid phase to reinforce subsequent pulses whereby an energy bearing standing wave is created in either said liquid or said vapor phase.

4. A thermal transfer process for converting a heated vapor into a contained pressure liquid comprising,
   creating a separately confined volume within said liquid of pressure less than the pressure of said liquid,
   inducing said vapor into said volume,
   substantially instantaneously interconnecting said volume and said liquid whereby the heat of said vapor is absorbed by the collapse of said liquid into said volume, and
   simultaneously withdrawing heat from said contained pressure liquid.

5. A thermal transfer process for converting a heated vapor into a contained pressure liquid comprising,
   periodically creating a separately confined volume within said liquid of pressure less than the pressure of said liquid,
   inducing said vapor into said volume, and
   substantially instantaneously interconnecting said volume and said liquid to cause implosive reaction pulses whereby the absorption of heat of said vapor by the collapse of said liquid into said volume assists in maintaining said reactions.

6. A thermal transfer process for converting a heated vapor into a pressure liquid within a container comprising,
   periodically creating an enclosed volume within said liquid of pressure less than the pressure of said liquid,
   inducing said vapor into said volume,
   substantially instantaneously interconnecting said liquid into said volume to cause implosive reaction pulses whereby the absorption of heat of said vapor by said liquid assists in maintaining said reactions, and
   causing said pulses reflected from said container to reinforce subsequent implosive reaction pulses and thereby create an energy bearing standing wave in the container.

7. A method of refrigeration in a system having a condenser, an evaporator, and means circulating a refrigerant as a substantially liquid phase through said condenser and as a substantially vapor phase in said evaporator, and expansion means to reduce the pressure of said liquid between said condenser and said evaporator, comprising,
   creating, at least once, a separately confined volume within the said liquid phase of pressure less than the pressure of said liquid,
   substantially instantaneously communicating said volume and said liquid to cause implosive reaction pulses in said liquid, and
   educing, under the influence of said pulse, a portion of said liquid through said expansion means whereby an energy bearing wave is created in said evaporator.

8. Apparatus for pumping refrigerant from a vapor phase to a substantially liquid phase and causing implosive reactions therein comprising,
   a cylinder having a vapor inlet and outlet,
   a piston reciprocable within said cylinder,
   a cylindrical member latched to said piston, said member including a resilient packing member to normally seal between the said inlet and outlet when said piston moves forward,
   spring means normally urging said cylindrical member toward said inlet,
   spring biased valve means at said inlet to open upon forward movement of said cylindrical member, and
   means to unlatch said cylindrical member at a given forward position of said piston, whereby said cylindrical member substantially instantaneously reverses its movement under the action of said spring means to cause an implosive reaction pulse in said refrigerant.

9. Apparatus for expanding a relatively high pressure liquid refrigerant and causing an implosive reaction pulse comprising, a cylinder forming an inlet at one end and an outlet at the other end, a first piston spring biased between said inlet and outlet to normally maintain a central position in said cylinder, a second piston latched to said first piston centrally and spring biased with respect to said first piston, means adjacent said inlet to unlatch said second piston in one position of said second piston, whereby said second piston instantaneously reverses with respect to movement of said first piston to cause an implosive reaction, and conduit means in said second piston to permit expansion of said liquid across said first piston.

References Cited by the Examiner

UNITED STATES PATENTS

| | | | |
|---|---|---|---|
| 1,877,390 | 9/1932 | Davis | 62—438 |
| 2,519,010 | 8/1950 | Zearfoss | 62—402 |
| 2,595,968 | 5/1952 | McCoy | 62—68 |
| 2,702,559 | 2/1955 | Bodine | 103—1 X |
| 2,772,543 | 12/1956 | Berry | 62—213 |
| 2,914,924 | 12/1959 | Murphy | 62—467 |
| 2,986,898 | 6/1961 | Wood | 62—174 |
| 3,006,154 | 10/1961 | Brandon | 62—115 |

ROBERT A. O'LEARY, *Primary Examiner.*

MEYER PERLIN, *Examiner.*

L. G. WISE, W. E. WAYNER, *Assistant Examiners.*